United States Patent
Yoshitomi et al.

(10) Patent No.: US 8,035,333 B2
(45) Date of Patent: Oct. 11, 2011

(54) FAN MOTOR SPEED CONTROL CIRCUIT, FAN APPARATUS, AND ELECTRONIC APPARATUS

(75) Inventors: Tetsuya Yoshitomi, Gunma (JP); Takashi Harashima, Gunma (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 440 days.

(21) Appl. No.: 12/147,640

(22) Filed: Jun. 27, 2008

(65) Prior Publication Data

US 2009/0009122 A1    Jan. 8, 2009

(30) Foreign Application Priority Data

Jul. 3, 2007 (JP) ................. 2007-175360

(51) Int. Cl.
  H02P 7/00 (2006.01)
  H02K 9/06 (2006.01)
  G05D 23/00 (2006.01)
(52) U.S. Cl. .................. 318/799; 318/798; 318/400.06; 318/471; 388/815; 388/822; 388/934
(58) Field of Classification Search ............ 318/400.01, 318/400.03, 400.06, 779, 798, 799, 805, 318/807, 810, 811, 471, 700; 388/809, 811, 388/816, 819, 822, 829, 934
See application file for complete search history.

(56) References Cited

U.S. PATENT DOCUMENTS

| | | | | |
|---|---|---|---|---|
| 4,856,078 A * | 8/1989 | Konopka | ...................... | 388/831 |
| 5,099,181 A * | 3/1992 | Canon | ...................... | 318/400.08 |
| 5,942,866 A * | 8/1999 | Hsieh | ...................... | 318/268 |
| 6,385,395 B1 * | 5/2002 | Horng et al. | ...................... | 388/809 |
| 6,407,525 B1 * | 6/2002 | Horng et al. | ...................... | 318/473 |
| 6,515,447 B2 * | 2/2003 | Horng et al. | ...................... | 318/807 |
| 6,703,803 B2 * | 3/2004 | Ohiwa et al. | ...................... | 318/400.17 |
| 6,737,860 B2 * | 5/2004 | Hsu et al. | ...................... | 324/161 |
| 7,106,107 B2 * | 9/2006 | Bhattacharya et al. | ...................... | 327/77 |
| 7,138,781 B2 * | 11/2006 | Murray et al. | ...................... | 318/400.04 |
| 7,301,294 B2 * | 11/2007 | Ogino et al. | ...................... | 318/400.05 |
| 7,386,224 B2 * | 6/2008 | Hsieh | ...................... | 388/829 |
| 7,420,340 B2 * | 9/2008 | Ogino et al. | ...................... | 318/268 |
| 7,564,204 B2 * | 7/2009 | Ogino et al. | ...................... | 318/400.01 |
| 2002/0109475 A1 * | 8/2002 | Horng et al. | ...................... | 318/473 |
| 2003/0020460 A1 * | 1/2003 | Hsu et al. | ...................... | 324/161 |
| 2005/0047761 A1 * | 3/2005 | Babb et al. | ...................... | 388/805 |
| 2005/0243482 A1 * | 11/2005 | Lee | ...................... | 361/33 |
| 2006/0108962 A1 * | 5/2006 | Murray et al. | ...................... | 318/610 |
| 2007/0024223 A1 * | 2/2007 | You et al. | ...................... | 318/272 |
| 2007/0047929 A1 * | 3/2007 | Hsieh | ...................... | 388/829 |
| 2007/0156292 A1 * | 7/2007 | Frankel et al. | ...................... | 700/300 |

FOREIGN PATENT DOCUMENTS

| | | |
|---|---|---|
| JP | 2004-120980 | 4/2004 |
| JP | 2005-151792 | 6/2005 |
| JP | 2007-068344 | 3/2007 |

* cited by examiner

*Primary Examiner* — Eduardo Colon-Santana

(57) ABSTRACT

A fan motor speed control circuit includes: a driving circuit configured to drive a fan motor so as to run at a rotation speed corresponding to a drive signal; a comparison circuit configured to output a comparison signal for matching a rotation speed of the fan motor with a target rotation speed, based on a reference signal corresponding to the target rotation speed of the fan motor and a speed signal corresponding to the rotation speed of the fan motor; and a selection circuit configured to output to the driving circuit the drive signal corresponding to one signal out of the reference signal and the comparison signal, the one signal being a signal by which the fan motor is driven at a higher rotation speed.

5 Claims, 9 Drawing Sheets

-- Prior Art --

-- Prior Art --

US 8,035,333 B2

FAN MOTOR SPEED CONTROL CIRCUIT, FAN APPARATUS, AND ELECTRONIC APPARATUS

CROSS-REFERENCE TO RELATED APPLICATION

This application claims the benefit of priority to Japanese Patent Application No. 2007-175360, filed Jul. 3, 2007, of which full contents are incorporated herein by reference.

BACKGROUND OF THE INVENTION

1. Field of the Invention

The present invention relates to a fan motor speed control circuit, a fan apparatus, and an electronic apparatus.

2. Description of the Related Art

An integrated circuit such as a CPU (Central Processing Unit) used for a server etc. increases in the amount of heat generated with increase in its operating speed. Since the CPU's increase in the amount of heat generated causes problems such as a thermal runaway, the server is generally provided with a fan for cooling the CPU. The rotation speed of the fan, namely, the rotation speed of a fan motor is generally controlled by a microcomputer etc., and an open control system (see, e.g., Japanese Patent Application Laid-Open Publication No. 2005-151792) and a feedback control system (see, e.g., Japanese Patent Application Laid-Open Publication No. 2007-68344) are known as a fan motor rotation speed control system.

The open control system (hereinafter, open control) is a system in which a driving circuit 500 drives a fan motor 510 based on a speed control signal for the fan motor 510 input from the microcomputer etc. as shown in FIG. 9. The speed control signal is for example a PWM (Pulse Width Modulation) signal and the rotation speed of the motor increases according to the duty ratio of an H level (high level) of the PWM signal.

The feedback control system (hereinafter, feedback control) is a system in which a fan motor 530 is driven so that the rotation speed of the fan motor 530 will match a target rotation speed, as shown in FIG. 10. To describe FIG. 10 in more detail, a reference voltage circuit 600 receives for example the PWM signal with the duty ratio corresponding to the target rotation speed of the fan motor 530 as a speed control signal from the microcomputer etc., and outputs a reference voltage Vref corresponding to the duty ratio of the H level. A speed voltage circuit 601 receives an FG (Frequency Generator) signal corresponding to the rotation speed of the fan motor 530 and outputs a speed voltage Vv corresponding to the FG signal. A comparison circuit 602 compares the reference voltage Vref and the speed voltage Vv and outputs a drive voltage Vdr as a comparison result. A motor driving circuit 603, based on the drive voltage Vdr, drives the motor 630 so that the speed voltage Vv will match the reference voltage Vref.

Recently, not only the prevention of the CPU thermal runaway etc. is performed, but also the reduction of power consumption of the fan motor and the fan motor speed control circuit and fan noise is performed by for example controlling the rotation speed of the fan motor according to an operation rate of the CPU. In the case of controlling the rotation speed of the fan motor according to the operation rate of the CPU as described above, it is preferable for the microcomputer controlling the rotation speed of the fan motor that the rotation speed of the fan motor is determined uniquely and linearly with respect to the duty ratio of the H level of the PWM signal, for example, as shown in a required characteristic of FIG. 11.

In the open control, as shown in FIG. 11, the rotation speed of the fan motor does not change linearly with respect to the duty ratio in the range between the duty ratio D1 and the duty ratio D2 due to for example the effect of the power consumption of the fan motor. Furthermore, in the case of the open control, the rotation speed of the fan motor varies due to variations of a power supply of the fan motor and manufacturing variations of the fan motor. Also, by a change of environment of an apparatus mounted with the fan, the fan motor, and objects to be cooled, system impedance indicating a pressure loss to an air flow within the apparatus mounted with the fan is caused to change, which results in a change of the rotation speed of the fan motor. Namely, in the open control, the rotation speed of the fan motor does not change uniquely and linearly with respect to the duty ratio of the H level of the PWM signal.

Accordingly, a preferable fan motor control system is the feedback control system that is insusceptible to effects of a change of the surrounding environment and by which the rotation speed of the fan motor changes uniquely and linearly with respect to the target rotation speed of the fan motor, namely, the duty ratio of the PWM signal to be input.

Incidentally, P-Q characteristic (air volume—static pressure characteristic) is among important characteristics of the fan and the fan motor. FIG. 12 is a diagram showing the P-Q characteristic, a relationship between the air volume and the rotation speed of the fan motor in the open control and the feedback control when the PWM signal with a predetermined duty ratio is input, where the air volume is taken as a horizontal axis, and the static pressure or the rotation speed of the fan motor is taken as a vertical axis. As shown in FIG. 12, under the open control, the rotation speed of the fan motor increases within a part of the range and this is caused by the effect of air resistance of the air sent by the fan.

On the other hand, within the above-mentioned part of the range under the feedback control: since the rotation speed of the fan motor is constant, the rotation speed of the fan motor is lower than that under the open control; and the static pressure is lower than that under the open control at the same air volume. The range within which the rotation speed of the fan motor under the open control is higher than that under the feedback control is defined as a range A.

As for a method of preventing lowering of the static pressure in the range A in the fan motor under the feedback control, there is a method of preventing deterioration of the P-Q characteristic by pre-programming the microcomputer so that the rotation speed of the fan motor will be higher in a deterioration range of the static pressure, as described in Japanese Patent Application Laid-Open Publication No. 2004-120980. However, the P-Q characteristic changes depending on the kind of fan, manufacturing variations of the fan and the fan motor, the duty ratio of the PWM signal as a speed control signal, etc. Therefore, the method of correcting the P-Q characteristic by pre-programming the microcomputer in the fan motor under the feedback control has a problem that the P-Q characteristic cannot be improved appropriately when changing from an expected characteristic.

SUMMARY OF THE INVENTION

A fan motor speed control circuit according to an aspect of the present invention includes: a driving circuit configured to drive a fan motor so as to run at a rotation speed corresponding to a drive signal; a comparison circuit configured to output a comparison signal for matching a rotation speed of the fan motor with a target rotation speed, based on a reference signal corresponding to the target rotation speed of the fan motor and a speed signal corresponding to the rotation speed of the fan motor; and a selection circuit configured to output to the driving circuit the drive signal corresponding to one signal out of the reference signal and the comparison signal, the one signal being a signal by which the fan motor is driven at a higher rotation speed.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
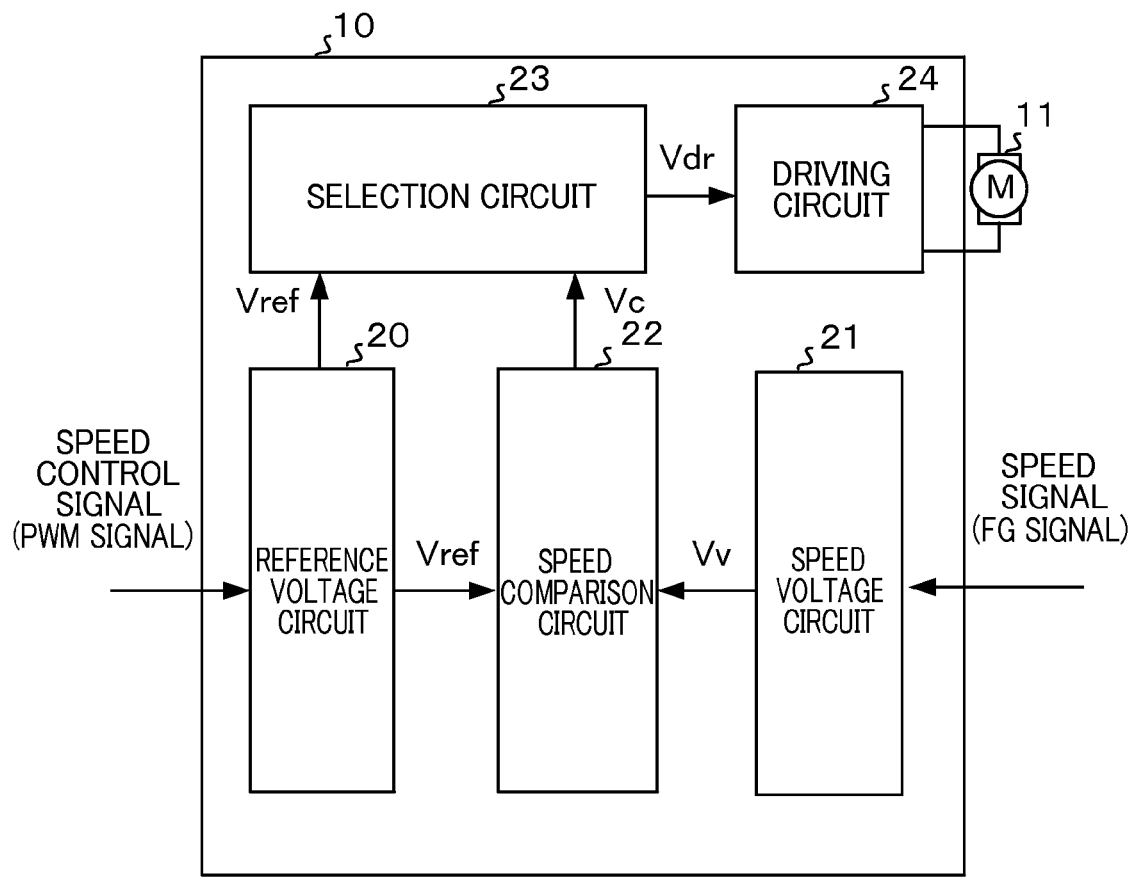
FIG. 1 is a diagram of a configuration of a fan motor speed control circuit 10 as one embodiment of the present invention.

FIG. 1 is a diagram of a configuration of a fan motor speed control circuit 10 as one embodiment of the present invention.

The fan motor speed control circuit 10 is a circuit that controls a rotation speed of a fan motor 11, based on a speed control signal corresponding to a target rotation speed of a fan motor 11 input from a microcomputer and a speed signal corresponding to an actual rotation speed of the fan motor 11 and comprises a reference voltage circuit 20, a speed voltage circuit 21, a speed comparison circuit 22, a selection circuit 23, and a driving circuit 24.

The fan motor 11 is a motor for rotating a fan for cooling a CPU etc., and a brushless motor etc. can be employed as the fan motor 11. It is assumed that the fan motor 11 according to the present embodiments drives for example the fan for cooling the CPU (electronic parts) to be used for a server (electronic apparatus).

Firstly, description will be made of an outline of respective circuits making up the fan motor speed control circuit 10 shown in FIG. 1. The reference voltage circuit 20 is a circuit that outputs a reference voltage Vref (reference signal) corresponding to the target rotation speed when input with the speed control signal. It is assumed that the speed control signal in the present embodiments is a PWM signal and that the reference voltage Vref decreases when the duty ratio of an H level (high level) of the PWM signal as the speed control signal to be input is large and increases when the duty ratio of the H level of the PWM signal is small.

The speed voltage circuit 21 is a circuit that outputs a speed voltage Vv (speed signal) corresponding to the speed signal. In the present embodiments, it is assumed that the speed signal is an FG signal having a frequency corresponding to the rotation speed of the motor and that the speed voltage Vv decreases when the rotation speed of the fan motor 11 is high and increases when the rotation speed of the fan motor 11 is low.

The speed comparison circuit 22 is a circuit that compares the reference voltage Vref and the speed voltage Vv and outputs a comparison voltage Vc (comparison signal) for causing the rotation speed of the fan motor to match the target rotation speed.

The selection circuit 23 is a circuit that selects a voltage that makes higher the rotation speed of the fan motor 11, out of the reference voltage Vref and the comparison voltage Vc and outputs a drive voltage Vdr (drive signal) corresponding to the selected voltage. In the present embodiments, the voltage at a lower voltage level is selected out of the reference voltage Vref and the comparison voltage Vc. The fan motor speed control circuit 10 puts the fan motor 11 under the feedback control when the comparison voltage Vc is lower than the reference voltage Vref and puts the fan motor 11 under the open control when the reference voltage Vref is lower than the comparison voltage Vc.

The driving circuit 24 is a circuit that drives the fan motor 11 according to the drive voltage Vdr. In the present embodiments, under the feedback control, the motor 11 is put in an acceleration control state of accelerating the motor 11 when the speed voltage Vv is higher than the reference voltage Vref and is put in a deceleration control state of decelerating the motor 11 when the speed voltage Vv is lower than the reference voltage Vref.

Next, description will be made of operation of respective circuits making up the fan motor speed control circuit 10 of the present embodiments.

Figure 2:
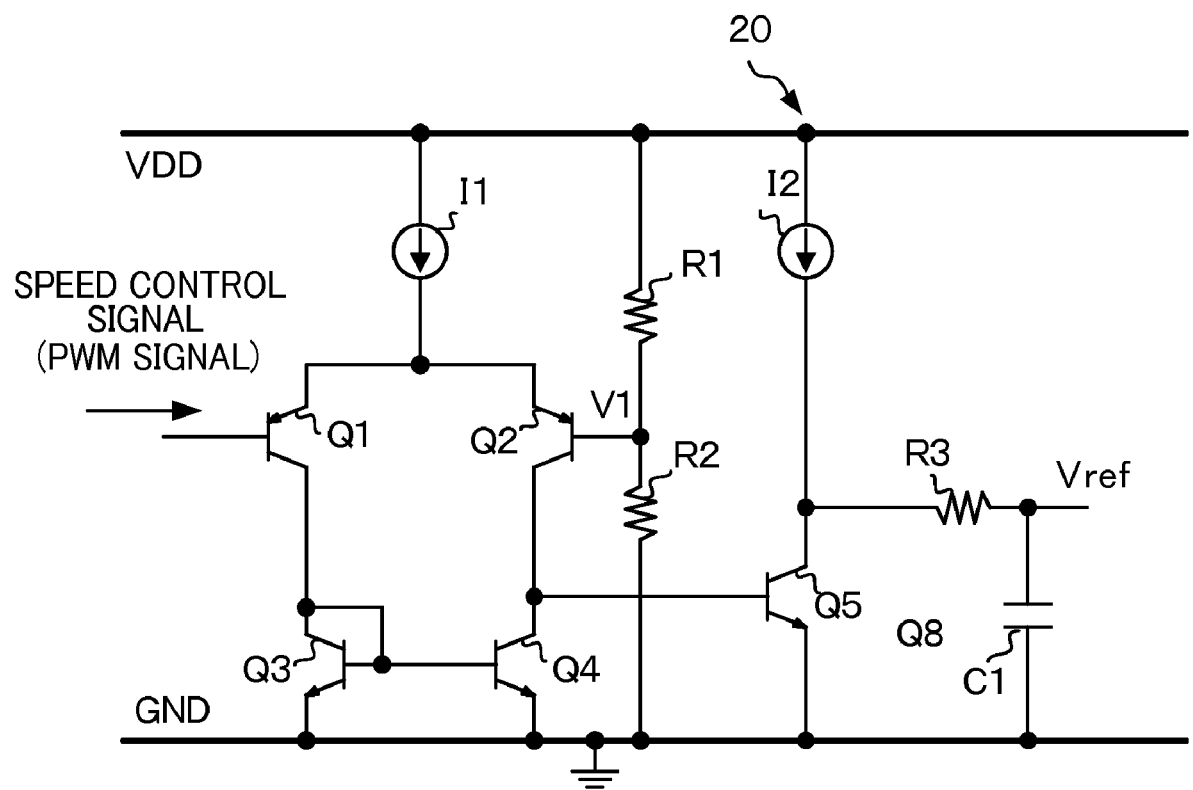
FIG. 2 is a diagram of one embodiment of a reference voltage circuit 20.

FIG. 2 is a diagram of one embodiment of the reference voltage circuit 20. The reference voltage circuit 20 comprises PNP transistors Q1 and Q2, NPN transistors Q3 to Q5, resistors R1 to R3, a capacitor C1, and bias current sources I1 and I2. In the reference voltage circuit 20, the PNP transistors Q1 and Q2, the NPN transistors Q3 and Q4, and the bias current source I1 make up a comparator, and a base electrode of the PNP transistor Q1 corresponds to a non-inverting input and the base electrode of the PNP transistor Q2 corresponds to an inverting input. A divided voltage V1 obtained by dividing the voltage by the resistors R1 and R2 connected in series between a power supply VDD and a ground GND is applied to the base electrode of the PNP transistor Q2.

When the PWM signal at the H level is input to the base electrode of the PNP transistor Q1, namely, when the potential of the base electrode of the PNP transistor Q1 is higher than the divided voltage V1, the potential of a collector electrode of the NPN transistor Q4 becomes H level and the NPN transistor Q5 is turned on. By the turning-on of the NPN transistor Q5, the potential at a node of the resistor R3 and the capacitor C1 connected becomes almost zero.

On the other hand, when the PWM signal at an L level (low level) is input to the PNP transistor Q1, namely, when the potential of the base electrode of the PNP transistor Q1 is lower than the divided voltage V1, the operation is opposite to the above described operation and the bias current from the bias current source I2 flows into the capacitor C1, and thereby the capacitor C1 is charged.

The resistor R3 and the capacitor C1 make up an LPF (Low Pass Filter) and smooth the voltage input to the LPF, namely, the voltage at the collector electrode of the NPN transistor Q5 that changes by turning-on and turning-off of the NPN transistor Q5. As a result, smoothed reference voltage Vref is output at the node of the resistor R3 and the capacitor C1 connected as an output of the LPF. This reference voltage Vref decreases when the duty ratio of the H level of the PWM signal is large and increases when the duty ratio of the H level of the PWM signal is small.

Figure 3:
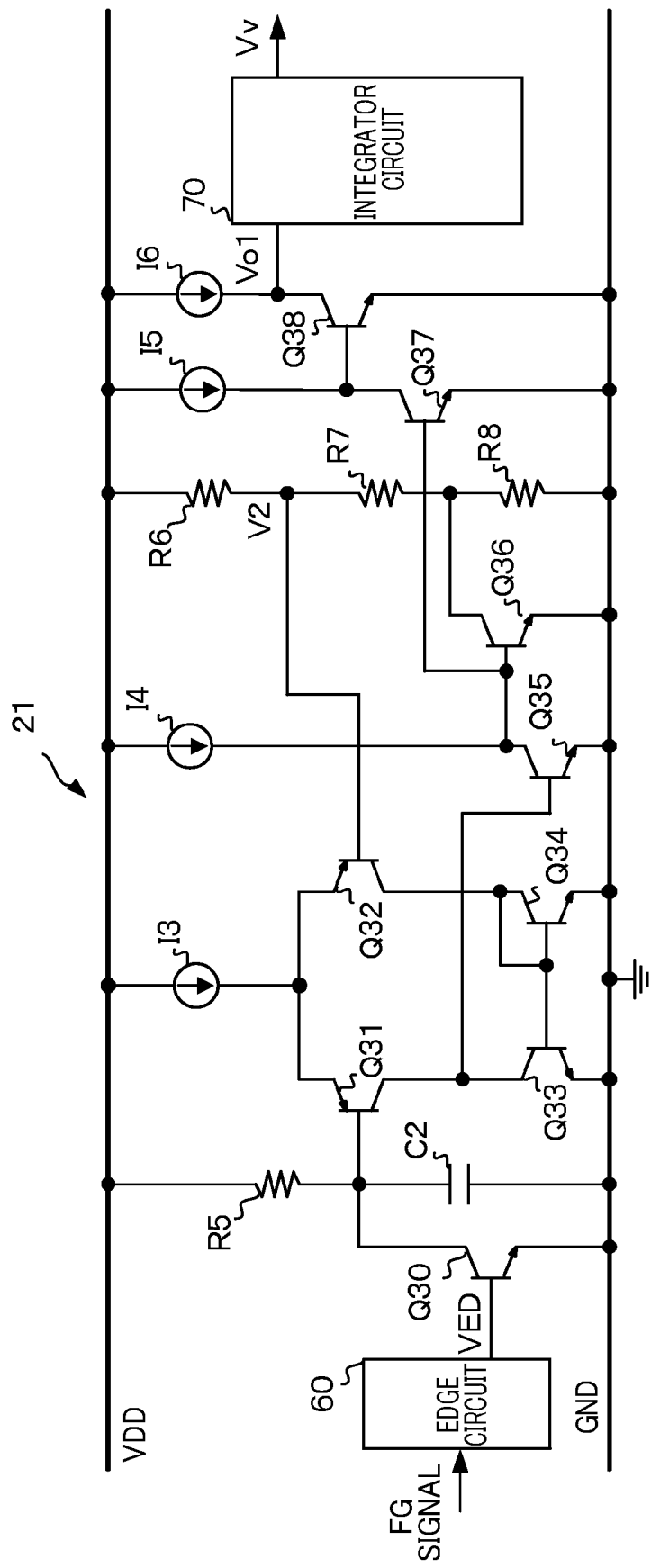
FIG. 3 is a diagram of one embodiment of a speed voltage output circuit 21.
Figure 6:
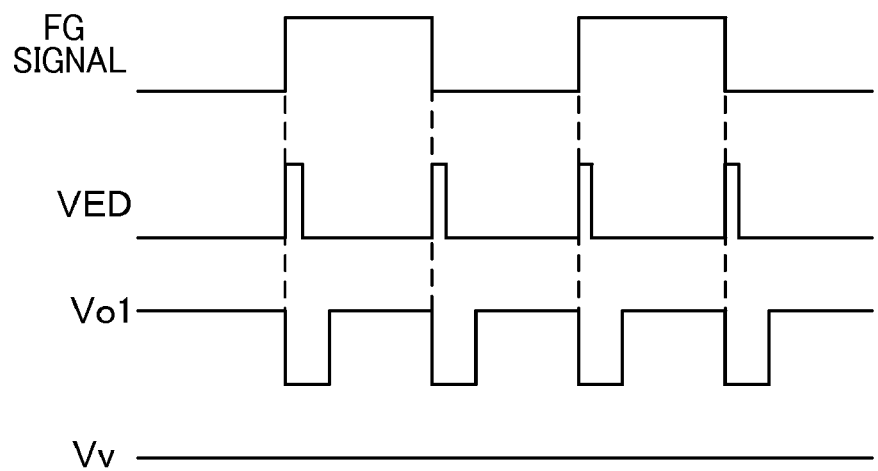
FIG. 6 is a waveform chart of primary signals in the speed voltage output circuit 21.

FIG. 3 is a diagram of one embodiment of the speed voltage output circuit 21. The speed voltage output circuit 21 comprises PNP transistors Q31 and Q32, NPN transistors Q30 and Q33 to Q38, resistors R5 to R8, a capacitor C2, bias current sources I3 to I6, an edge circuit 60, and an integrator circuit 70. The edge circuit 60 in the speed voltage circuit 21 detects the edge of an input pulse signal, thereby changing the output edge signal VED to a short pulse. FIG. 6 is a waveform chart of primary signals in the speed voltage output circuit 21 and reference will be made to FIG. 6 when appropriate. When the edge circuit 60 is input with the FG signal, the edge signal VED is changed to the short pulse at the edge of the FG signal, as described above. With the edge signal VED being input to the base electrode of the NPN transistor Q30, the NPN transistor Q30 is turned on or off depending on the level of the edge signal.

When the edge signal VED is at L level, the NPN transistor Q30 is turned off and the capacitor C2 is charged. The PNP transistor Q31 and Q32, the NPN transistors Q33 and Q34, and the bias current source I3 make up a comparator. When the capacitor C2 is charged and thereby the potential at the base electrode of the PNP transistor Q31 becomes higher than a divided voltage V2 at the resistors R6 to R8 connected in series between the power supply VDD and the ground GND, the potential at the collector electrode of the NPN transistor Q33 becomes L level. Accordingly, the NPN transistor Q35 is turned off, the NPN transistor Q37 is turned on, and the NPN transistor Q38 is turned off. Therefore, an output voltage Vo1 becomes H level.

On the other hand, when the edge signal VED is at H level, the operation is opposite to the above described operation and finally the NPN transistor Q38 is tuned on. Therefore, the output voltage Vo1 becomes L level. The width within which the output voltage Vo1 is at L level is determined by a time constant of the resistor R5 and the capacitor C2. Therefore, even when the rotation speed of the fan motor 11 changes, the width within which the output voltage Vo1 is at L level is constant if the time constant is fixed. However, the period of the output voltage Vo1 changes depending on the rotation speed of the fan motor 11 that is the period of the edge signal VED. For this reason, the width of the L level within one period of the output voltage Vo1 becomes large when the rotation speed of the fan motor is high and the width of the L level within one period of the output voltage Vo1 becomes small when the rotation speed of the fan motor is low. The integrator circuit 70 integrates the output voltage Vo1, thereby outputting the speed voltage Vv corresponding to the H level of the output voltage Vo1. Therefore, the speed voltage Vv decreases when the rotation speed of the fan motor 11 is high and increases when the rotation speed of the fan motor 11 is low.

Figure 4:
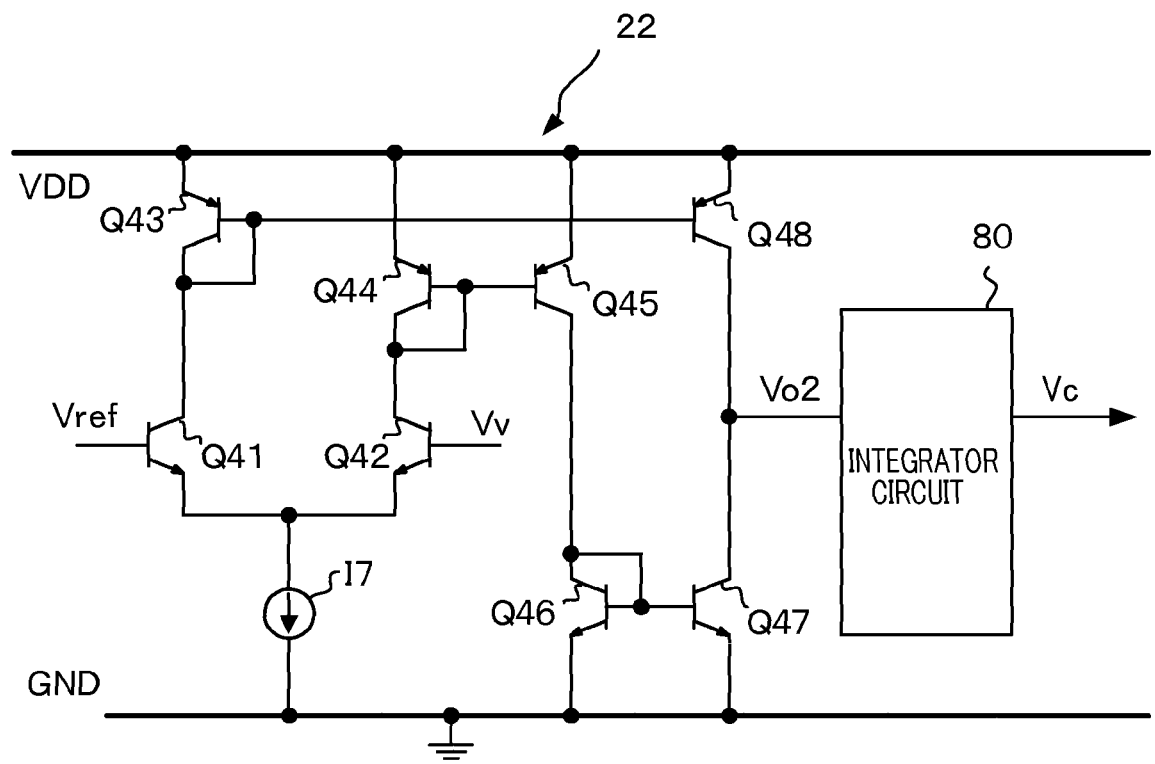
FIG. 4 is a diagram of one embodiment of a speed comparison circuit 22.

FIG. 4 is a diagram of one embodiment of the speed comparison circuit 22. The speed comparison circuit 22 comprises PNP transistors Q43 to Q45 and Q48, NPN transistors Q41, Q 42, Q46, and Q47, a bias current source 17, and an integrator circuit 80. The speed comparison circuit 22 has an input of the reference voltage Vref and the speed voltage Vv. As described above, in the present embodiments, the motor 11 is put in the acceleration control state of accelerating the motor 11 when the speed voltage Vv is higher than the reference voltage Vref and is put in the deceleration control state of decelerating the motor 11 when the speed voltage Vv is lower than the reference voltage Vref.

The PNP transistors Q43, Q44, Q45, and Q48, the NPN transistors Q41, Q42, Q46, and Q47, and a bias current source I7 make up a comparator. The base electrode of the NPN transistor 41 corresponds to the non-inverting input of the comparator and the base electrode of the NPN transistor Q42 corresponds to the inverting input of the comparator. Therefore, in the acceleration control state, the NPN transistor Q47 is turned on and the output voltage Vo2 becomes L level. On the other hand, in the deceleration control state, since the operation is opposite to that of the acceleration control state, the output voltage Vo2 becomes H level finally. The integrator circuit 80 integrates the output voltage Vo2, thereby outputting the comparison voltage Vc corresponding to the output voltage Vo2. The voltage level of the comparison voltage Vc decreases in the acceleration control state and increases in the deceleration control state.

Figure 5:
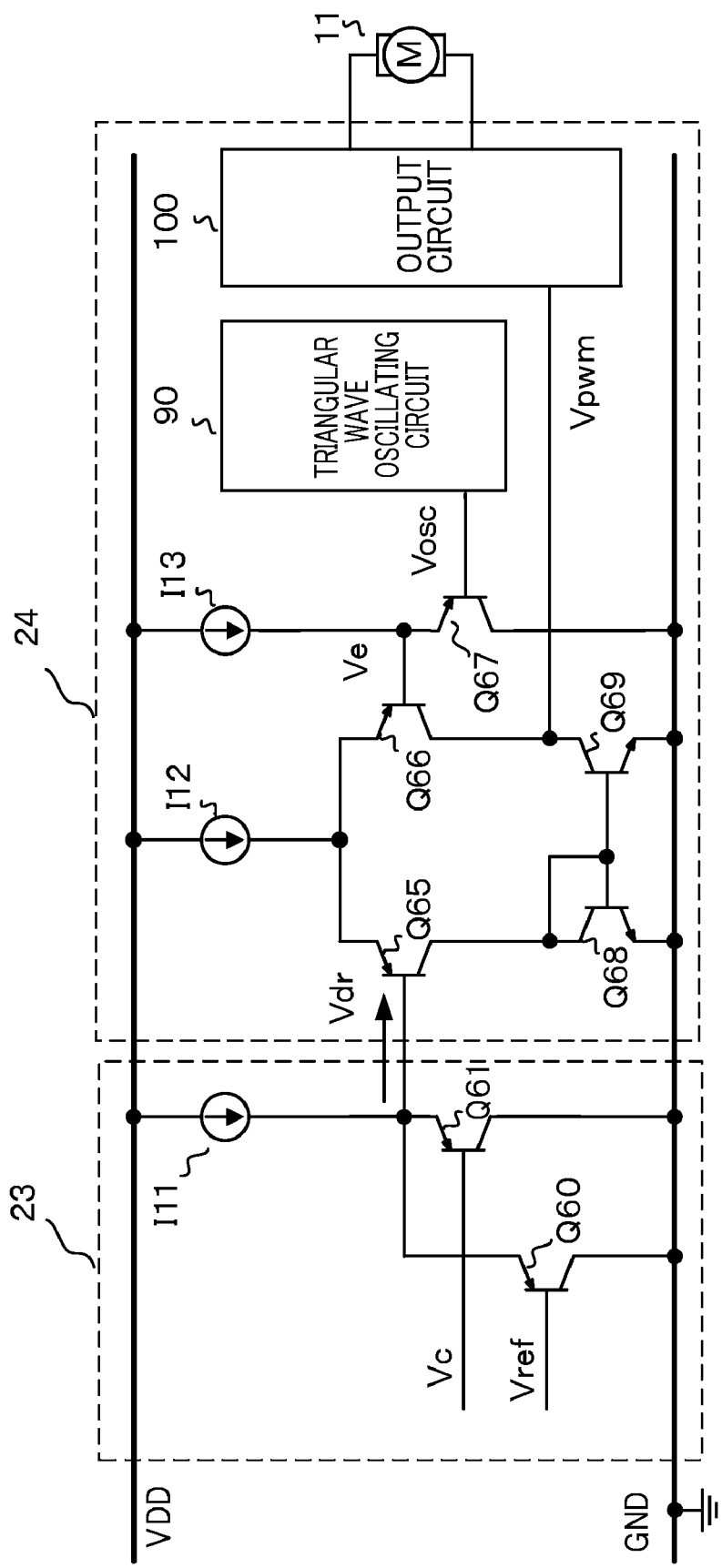
FIG. 5 is a diagram of one embodiment of a selection circuit 23 and a driving circuit 24.

FIG. 5 is a diagram of one embodiment of the selection circuit 23 and the driving circuit 24. The selection circuit 23 comprises the PNP transistors Q60 and Q61 and the bias current source I11. The PNP transistors Q60 and Q61 correspond to a first transistor and a second transistor of the present invention respectively, and the bias current source I11 corresponds to a bias current source of the present invention. In the selection circuit 23, the emitter electrodes of the respective PNP transistors Q60 and Q61 are connected to the bias current source I11, and thereby an emitter-follower circuit is constituted for each transistor. Therefore, the voltage corresponding to the voltage of a lower voltage level, out of the voltages applied to respective base electrodes of the PNP transistors Q60 and Q61, is output from the emitter electrode of the PNP transistors Q60 and Q61 as the drive voltage Vdr.

Figure 7:
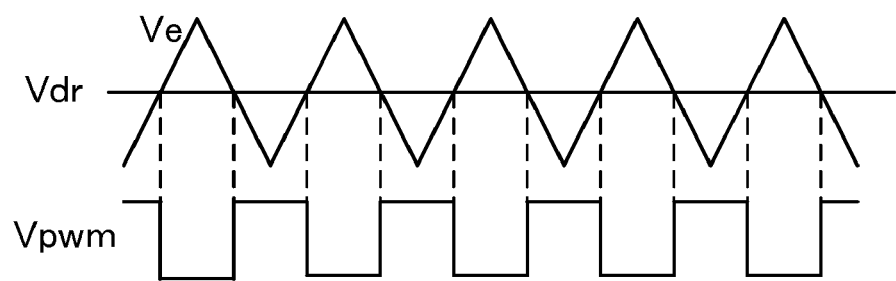
FIG. 7 is a waveform chart of primary signals in the driving circuit 24.

The driving circuit 24 comprises the PNP transistors Q65 to Q67, the NPN transistors Q68 and Q69, the bias current sources I12 and I13, a triangular wave oscillating circuit 90, and an output circuit 100. For the output circuit 100, there may be used for example an H bridge circuit. The driving circuit 24 is a circuit that drives the output circuit 100 according to the drive voltage Vdr from the selection circuit 23. FIG. 7 is a waveform chart of primary signals in the driving circuit 24 and reference will be made to FIG. 7 when appropriate. A triangular wave output Vosc from the triangular wave oscillating circuit 90 is shifted by the emitter-follower composed of the PNP transistor Q67 and the bias current source I13, and is output as a voltage Ve from the emitter electrode of the PNP transistor Q67. By comparing the voltage Ve and the drive voltage Vdr as an output from the selection circuit 23 in a comparator, a PWM drive signal Vpwm for driving the output circuit 100 is output, where the comparator comprises the PNP transistor Q65 and Q66, the NPN transistors Q68 and Q69, and a bias current source I12. The output circuit 100 drives the fan motor 11, based on the PWM drive signal Vpwm. The comparator comprising the PNP transistor Q65 and Q66, the NPN transistors Q68 and Q69, and a bias current source I12 corresponds to a comparator in the present invention.

Here, description will be made of the operation of the fan motor speed control circuit 10 when the comparison voltage Vc is lower than the reference voltage Vref and the comparison voltage Vc is selected as the drive voltage Vdr. If the comparison voltage Vc is selected as the drive voltage Vdr, the fan motor speed control circuit 10 puts the fan motor 11 under the feedback control. In more detail, in the acceleration control state, with the rotation speed of the fan motor 11 being accelerated, the period of the pulse of the FG signal corresponding to the rotation speed of the fan motor is shortened and the period of time of the L level increases within the output voltage Vo1 in the speed voltage circuit 21. Accordingly, the speed voltage Vv decreases so as to match the reference voltage Vref. On the other hand, in the deceleration control state, with the rotation speed of the fan motor 11 being decelerated, the period of the pulse of the FG signal corresponding to the rotation speed of the fan motor is lengthened and the period of time of the L level decreases within the output voltage Vo1 in the speed voltage circuit 21. Accordingly, the speed voltage Vv increases so as to match the reference voltage Vref. As seen above, since the fan motor speed control circuit 10 feeds back the speed voltage Vv corresponding to the rotation speed of the fan motor 11 and controls the rotation speed of the fan motor 11 so that the speed voltage Vv will match the level of the reference voltage Vref, the rotation speed of the fan motor 11 has a unique and linear relation with the reference voltage Vref, namely, the duty ratio of the H level of the PWM signal.

Next, description will be made of the operation of the fan motor speed control circuit 10 when the reference voltage Vref is lower than the comparison voltage Vc and the reference voltage Vref is selected as the drive voltage Vdr.

Since the reference voltage Vref is output as the drive voltage Vdr from the selection circuit 23, the driving circuit 24 drives the fan motor 11 based on the reference voltage Vref. Namely, the rotation speed of the fan motor 11 is put under the open control and changes according to the duty ratio of the H level of the PWM signal.

Hereinabove, description has been made of the operation in respective cases where the fan motor speed control circuit 10 is under the feedback control and where the circuit is under the open control.

Description will be made of the operation when the fan motor speed control circuit 10 of the present embodiments is actually used in an apparatus such as a server. In this connection, there is a general fan characteristic that when the PWM signal with a predetermined duty ratio is input in the environment of free air, namely, zero static pressure, the comparison voltage Vc is lower than the reference voltage Vref. Therefore, in the fan motor speed control circuit 10 of the present embodiments, the feedback control is performed so that the rotation speed of the fan motor will change linearly with respect to the duty ratio of the PWM signal in the free air.

Figure 8:
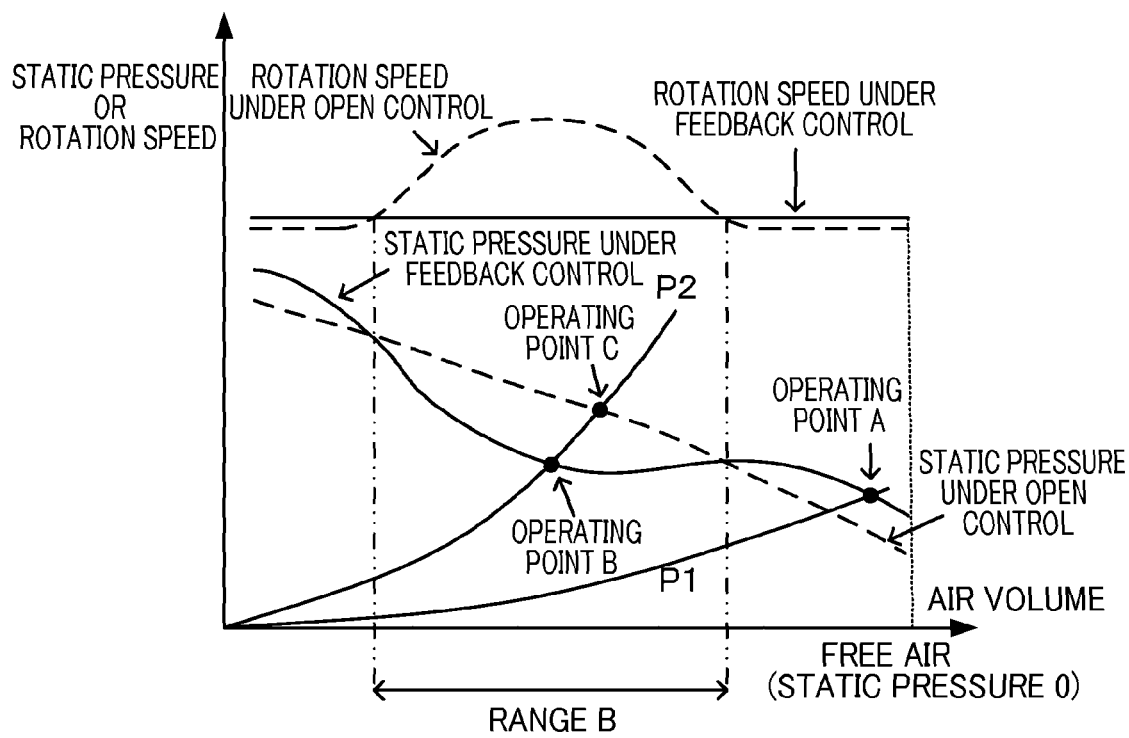
FIG. 8 is a diagram of P-Q characteristic, a relationship between air volume and a rotation speed of a fan motor, and a relationship between the air volume and system impedance in an open control and a feedback control of the fan motor speed control circuit 10 when a PWM signal with a predetermined duty ratio is input.
Figure 9:
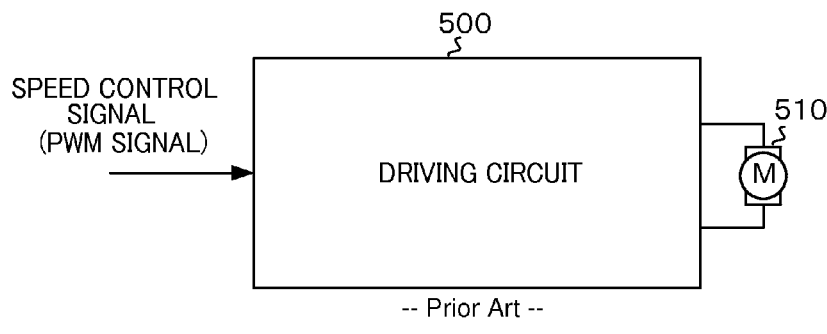
FIG. 9 shows one example of a block diagram of a conventional motor speed control circuit under the open control.
Figure 10:
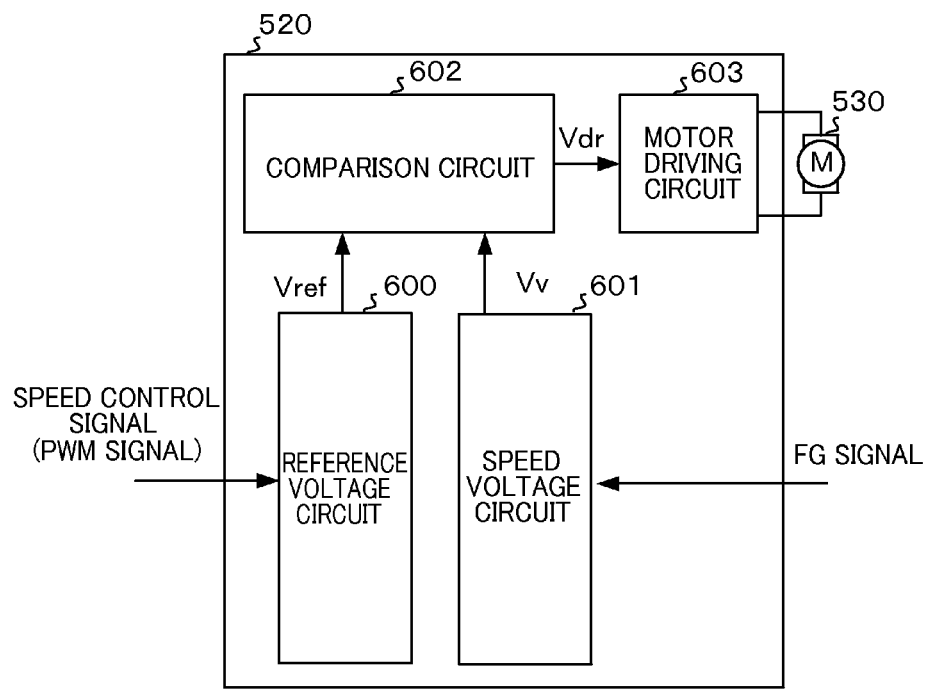
FIG. 10 is a block diagram of the conventional motor speed control circuit under the feedback control.
Figure 11:
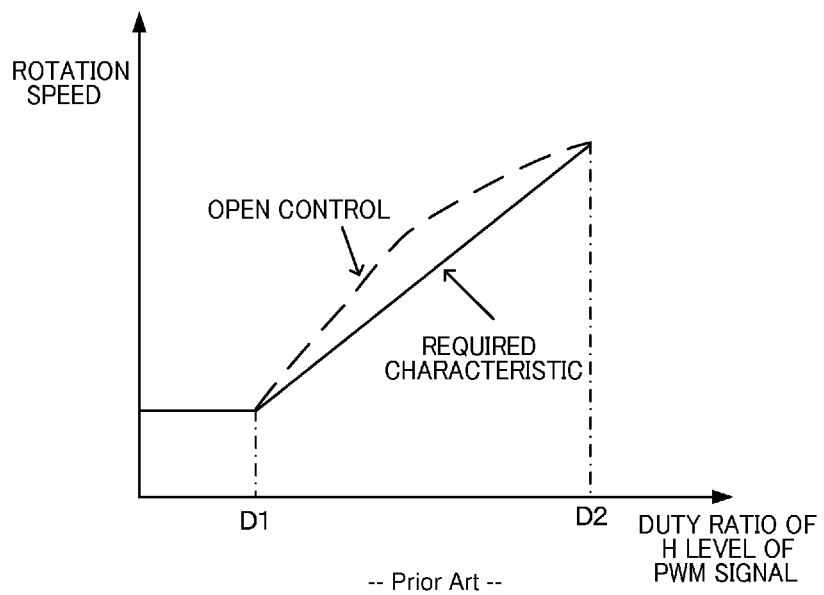
FIG. 11 is a diagram of one example of required characteristic of the fan motor rotation speed with respect to the duty ratio of the PWM signal and the rotation speed in the case of the open control.
Figure 12:
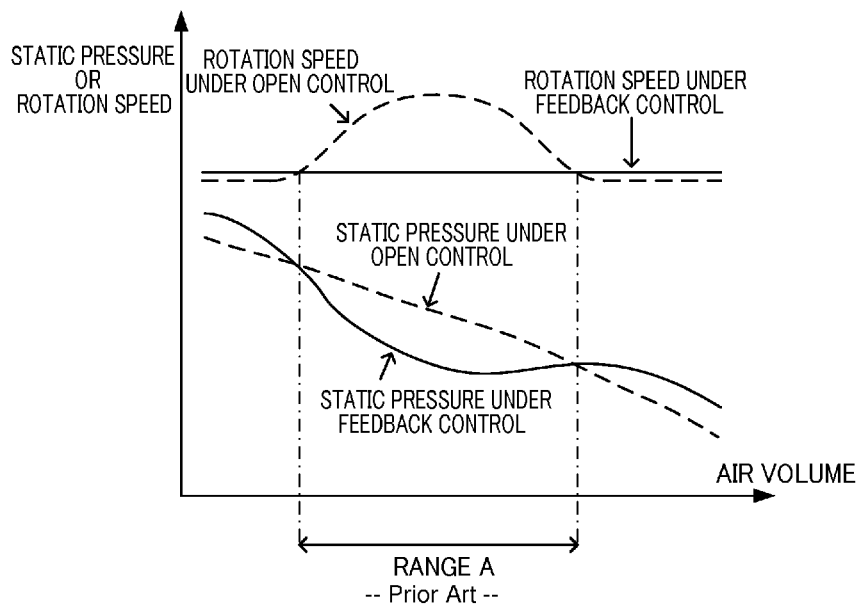
FIG. 12 is a diagram of the P-Q characteristic, the relationship between the air volume and the rotation speed of the fan motor in the case of the open control and the feedback control of the fan motor speed control circuit when the PWM signal with a predetermined duty ratio is input.

Here, description will be made of a P-Q characteristic and the rotation speed of the fan motor which become important in describing the operation when the fan motor speed control circuit 10 is actually used in the apparatus such as the server. FIG. 8 shows the P-Q characteristic, a relationship between the air volume and the rotation speed of the fan motor, and a relationship between the air volume and system impedance in the open control and in the feedback control when the PWM signal with a predetermined duty ratio is input. FIG. 8 shows the P-Q characteristic and the rotation speed of the fan motor when the fan motor 11 is driven only by the open control and when the fan motor 11 is driven only by the feedback control. When the fan motor 11 is under the feedback control, the rotation speed of the fan motor is constant, but when the fan motor 11 is under the open control, the rotation speed of the fan motor increases in some part of the range due to the effect of air resistance of the air sent by the fan. Here, if the range within which the rotation speed of the fan motor is higher under the open control than that under the feedback control is defined as a range B, then the operation of the fan motor speed control circuit 10 of the present embodiments can be divided into two cases: the case of operating within the range B; and the case of operating in the range other than the range B. Therefore, description will be made of the operation of the fan motor speed control circuit 10 of the present embodiments, for the case of operation within the range B and for the case of operation in the range other than the range B, separately.

Firstly, in the case of the operation in the range other than the range B, the rotation speed of the fan and the fan motor 11 is the same as the rotation speed in the case of the free air. Accordingly, the effect of the air resistance etc. on the fan and the fan motor is the same as that in the case of the free air, and therefore the same comparison voltage Vc as that in the case of the free air is output with respect to the comparison voltage Vc in the case of being under the feedback control as well. As described above, the fan motor speed control circuit 10 of the present embodiments has the voltage level of the comparison voltage Vc lower than the voltage level of the reference voltage Vref, in the free air state. Therefore, for example, in the case of system impedance P1, as a representative example in the range other than the range B, the fan and the fan motor 11 operate at an operating point A and the feedback control is selected. Here, while description has been made taking as example the case of the system impedance P1, since the rotation speed of the fan motor is the same as that in the case of the free air in the range other than the range B wherein the rotation speed under the open control is higher than the rotation speed under the feedback control, likewise, the feedback control is selected.

Next, in the case of the operation in the range B, description will be made taking as a representative example the system impedance P2. In the range B, in the case of being under the open control, the rotation speed of the fan motor 11 increases due to the effect of the air resistance of the air sent by the fan. Therefore, in order to obtain a constant rotation speed by the feedback control in the range B, it is necessary to drive the fan motor 11 so that the rotation speed of the fan motor 11 will be made lower as compared with the range other than the range B. For this reason, in the range B, the voltage level of the comparison voltage Vc is made higher as compared with the case of other than the range B. When the comparison voltage Vc is higher than the reference voltage Vref, which is caused by the increase in the voltage level of the comparison voltage Vc, the reference voltage Vref is output as the drive voltage Vdr from the selection circuit 23. As a result, in the fan motor speed control circuit 10, the open control is selected and the rotation speed of the fan motor 11 is increased. In other words, the operating point of the fan and the fan motor 11 in the system impedance P2 is changed from the operating point B to the operating point C and the P-Q characteristic of the fan and the fan motor 11 is improved.

As seen above, the fan motor speed control circuit 10 in the present embodiments specifies the lower limit of the rotation speed of the fan motor and selects the control by which the rotation speed of the fan motor 11 is heightened. While, in FIG. 8, description has been made of the operation of the fan motor speed control circuit 10 in the cases of different system impedance, the fan motor speed control circuit 10 of the present embodiments selects the open control in the range in which the rotation speed of the fan motor under the open control is higher than the rotation speed of the fan motor under the feedback control, even when the system impedance is fixed and the P-Q characteristic is changed. Therefore, even when the system impedance is fixed and different kinds of fan and fan motor are used or even when the change of the duty ratio of the PWM signal results in the change of the P-Q characteristic, the P-Q characteristic is improved.

The fan motor speed control circuit 10 having the above configuration to which the present embodiments are applied, is capable of changing the rotation speed of the motor 11 uniquely and linearly with respect to the duty ratio of the H level of the PWM signal by the feedback control and also selecting the open control and improving the P-Q characteristic in a deterioration range of the P-Q characteristic.

In the present embodiments, the reference voltage Vref, the speed voltage Vv, and the comparison voltage Vc are a voltage signal, but are not to be limited thereto. For example, it may be so arranged that the reference voltage Vref and the speed voltage Vv are given as digital values and that the PWM signal is generated by calculating the digital values (see, e.g., Japanese Patent Application Laid-Open Publication Nos. 2003-259629 and 2004-282842). The triangular wave in the present embodiments is a wave having an equal period of time for rising and falling as shown in FIG. 7, but is not to be limited thereto. The triangular wave may have a waveform like a sawtooth wave having a different period of time for changing between a predetermined voltage level and another predetermined voltage level for the case of rising and for the case of falling.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A fan motor speed control circuit comprising:
    a driving circuit configured to drive a fan motor so as to run at a rotation speed corresponding to a drive signal;
    a comparison circuit configured to output a comparison signal for matching a rotation speed of the fan motor with a target rotation speed, based on a reference signal corresponding to the target rotation speed of the fan motor and a speed signal corresponding to the rotation speed of the fan motor; and
    a selection circuit to which the reference signal corresponding to the target rotation speed of the fan motor and the comparison signal output from the comparison circuit are input, the selection circuit configured to select one signal out of the reference signal and the comparison signal and output to the driving circuit the drive signal corresponding to the one signal, the one signal being a signal by which the fan motor is driven at a higher rotation speed.

2. The fan motor speed control circuit of claim 1,
    wherein the reference signal and the comparison signal are a voltage signal,
    wherein the selection circuit comprises:
        a first transistor whose control electrode is to be input with the reference signal;
        a second transistor whose control electrode is to be input with the comparison signal; and
        a bias current source connected in series to the first transistor and the second transistor so that a voltage corresponding to one signal out of the reference signal and the comparison signal is output from one electrode out of two electrodes different from the control electrode of the first transistor and the second transistor, the one signal being a signal by which the fan motor is driven at a higher rotation speed, and the one electrode being an electrode for controlling a conduction state together with the control electrode, and
    wherein the drive signal is a voltage signal corresponding to the voltage output to the one electrode of the first transistor and the second transistor.

3. The fan motor speed control circuit of claim 2,
    wherein the driving circuit comprises:
        an oscillating circuit configured to output a triangular wave oscillating at a predetermined frequency;
        a comparator configured to generate a PWM signal based on the triangular wave and the drive signal; and
        an output circuit configured to drive the fan motor based on the PWM signal.

4. A fan apparatus comprising:
    a fan;
    a fan motor configured to drive the fan;
    a driving circuit configured to drive the fan motor so as to run at a rotation speed corresponding to a drive signal;
    a comparison circuit configured to output a comparison signal for matching a rotation speed of the fan motor with a target rotation speed, based on a reference signal corresponding to the target rotation speed of the fan motor and a speed signal corresponding to the rotation speed of the fan motor; and
    a selection circuit to which the reference signal corresponding to the target rotation speed of the fan motor and the comparison signal output from the comparison circuit are input, the selection circuit configured to select one signal out of the reference signal and the comparison signal and output to the driving circuit the drive signal corresponding to the one signal, the one signal being a signal by which the fan motor is driven at a higher rotation speed.

5. An electronic apparatus comprising:
    a fan;
    a part to be cooled by the fan;
    a fan motor configured to drive the fan;
    a driving circuit configured to drive the fan motor so as to run at a rotation speed corresponding to a drive signal;
    a comparison circuit configured to output a comparison signal for matching a rotation speed of the fan motor with a target rotation speed, based on a reference signal corresponding to the target rotation speed of the fan motor and a speed signal corresponding to the rotation speed of the fan motor; and
    a selection circuit to which the reference signal corresponding to the target rotation speed of the fan motor and the comparison signal output from the comparison circuit are input, the selection circuit configured to select one signal out of the reference signal and the comparison signal and output to the driving circuit the drive signal corresponding to the one signal, the one signal being a signal by which the fan motor is driven at a higher rotation speed.

* * * * *